United States Patent
Montero et al.

(10) Patent No.: US 12,455,832 B1
(45) Date of Patent: Oct. 28, 2025

(54) COMPRESSING DATA PORTIONS IN A TRANSLATION LOOKASIDE BUFFER

(71) Applicant: QUALCOMM Incorporated, San Diego, CA (US)

(72) Inventors: Adrian Montero, Austin, TX (US); Roshan Sreekumar Nair, Austin, TX (US); Vikas Kumar Sinha, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/648,081

(22) Filed: Apr. 26, 2024

(51) Int. Cl.
  *G06F 12/10* (2016.01)
  *G06F 12/02* (2006.01)
  *G06F 12/0895* (2016.01)
  *G06F 12/1027* (2016.01)

(52) U.S. Cl.
  CPC ...... *G06F 12/1027* (2013.01); *G06F 12/0246* (2013.01); *G06F 12/0895* (2013.01)

(58) Field of Classification Search
  None
  See application file for complete search history.

(56) References Cited

U.S. PATENT DOCUMENTS

| | | | |
|---|---|---|---|
| 9,569,348 B1* | 2/2017 | Deming | G06F 12/00 |
| 2014/0281116 A1 | 9/2014 | Abdallah et al. | |
| 2015/0095609 A1 | 4/2015 | Smith | |
| 2016/0140050 A1* | 5/2016 | Kujtkowski | G06F 12/1027 711/108 |
| 2017/0255566 A1 | 9/2017 | Kujtkowski et al. | |
| 2017/0286296 A1 | 10/2017 | Mukherjee | |
| 2018/0314644 A1 | 11/2018 | Hwang et al. | |
| 2019/0205264 A1* | 7/2019 | Varghese | G06F 12/1054 |
| 2023/0135599 A1 | 5/2023 | Monti et al. | |
| 2023/0153251 A1 | 5/2023 | Zheng et al. | |
| 2024/0273035 A1* | 8/2024 | Montero | G06F 12/1027 |

FOREIGN PATENT DOCUMENTS

| | | |
|---|---|---|
| CN | 114780452 A | 7/2022 |
| WO | 2022203993 A1 | 9/2022 |

OTHER PUBLICATIONS

International Search Report and Written Opinion—PCT/US2025/017670—ISA/EPO—Jun. 4, 2025.

* cited by examiner

*Primary Examiner* — Kevin Verbrugge
(74) *Attorney, Agent, or Firm* — Patter +Sheridan LLP

(57) ABSTRACT

Certain aspects of the present disclosure provide techniques and apparatus for translation lookaside buffer (TLB) compression. Embodiments include determining that a plurality of physical memory addresses, associated with a plurality of virtual memory addresses, are contiguous with one another and share one or more common address bits or one or more common attribute bits, wherein each respective physical memory address of the plurality of physical memory addresses corresponds to a separate respective physical memory page. Embodiments include generating a tag for an entry in a TLB, the tag representing the plurality of virtual memory addresses. Embodiments include associating, in the entry in the TLB, the tag with data comprising: a single instance of the one or more common address bits or the one or more common attribute bits of the plurality of physical memory addresses; and other bits of the plurality of physical memory addresses.

19 Claims, 6 Drawing Sheets

500

505

Determine that a plurality of physical memory addresses, which are associated with a plurality of virtual memory addresses, are contiguous with one another and share one or more common address bits or one or more common attribute bits, wherein each respective physical memory address of the plurality of physical memory addresses corresponds to a separate respective physical memory page

510

Generate a tag for an entry in a TLB, the tag representing the plurality of virtual memory addresses

515

Associate, in the entry in the TLB, the tag with data comprising: a single instance of the one or more common address bits or the one or more common attribute bits of the plurality of physical memory addresses; and other bits of the plurality of physical memory addresses

*FIG. 5*

COMPRESSING DATA PORTIONS IN A TRANSLATION LOOKASIDE BUFFER

INTRODUCTION

Aspects of the present disclosure relate to translation lookaside buffer (TLB) compression.

A translation lookaside buffer (TLB) is a type of memory cache that stores recent translations of virtual memory addresses (or in short, virtual addresses (VAs)) to physical memory addresses (or in short, physical addresses (PAs)) to enable faster retrieval. This high-speed cache is set up to keep track of recently used page table entries (PTEs). Also known as an address-translation cache, a TLB is a part of the processor's memory management unit (MMU).

A device may comprise a processing system comprising one or more central processing units (CPUs), graphics processing units (GPUs), and/or other types of processors, an MMU, and a TLB. The processing system may communicate with a physical memory system including, for example, Random Access Memory (RAM). In the physical memory system there is generally at least one page table that maps each virtual address to a physical address associated with the physical memory system.

Using the map, the MMU may translate any virtual address into a physical address. A substantially complete map may be provided in the physical memory system, whereas the TLB may include a smaller subset of translations (typically corresponding to virtual addresses of high importance or frequent/recent use). The TLB is smaller than the physical memory system, and can therefore be searched more quickly.

As computing technology advances, there is an increasing demand for higher performance and resource-efficiency with respect to memory management. For example, computing processes such as training and running machine learning models may utilize large amounts of physical computing resources, and improving the efficiency and performance of memory accesses is particularly beneficial for such processes.

BRIEF SUMMARY

Certain aspects provide a method, comprising: determining that a plurality of physical memory addresses, which are associated with a plurality of virtual memory addresses, are contiguous with one another and share one or more common address bits or one or more common attribute bits, wherein each respective physical memory address of the plurality of physical memory addresses corresponds to a separate respective physical memory page; generating a tag for an entry in a TLB, the tag representing the plurality of virtual memory addresses; and associating, in the entry in the TLB, the tag with data comprising: a single instance of the one or more common address bits or the one or more common attribute bits of the plurality of physical memory addresses; and other bits of the plurality of physical memory addresses.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain features of one or more aspects of the present disclosure and are therefore not to be considered limiting of the scope of this disclosure.

FIG. 5 is a flow diagram depicting an example method of TLB compression according to various aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
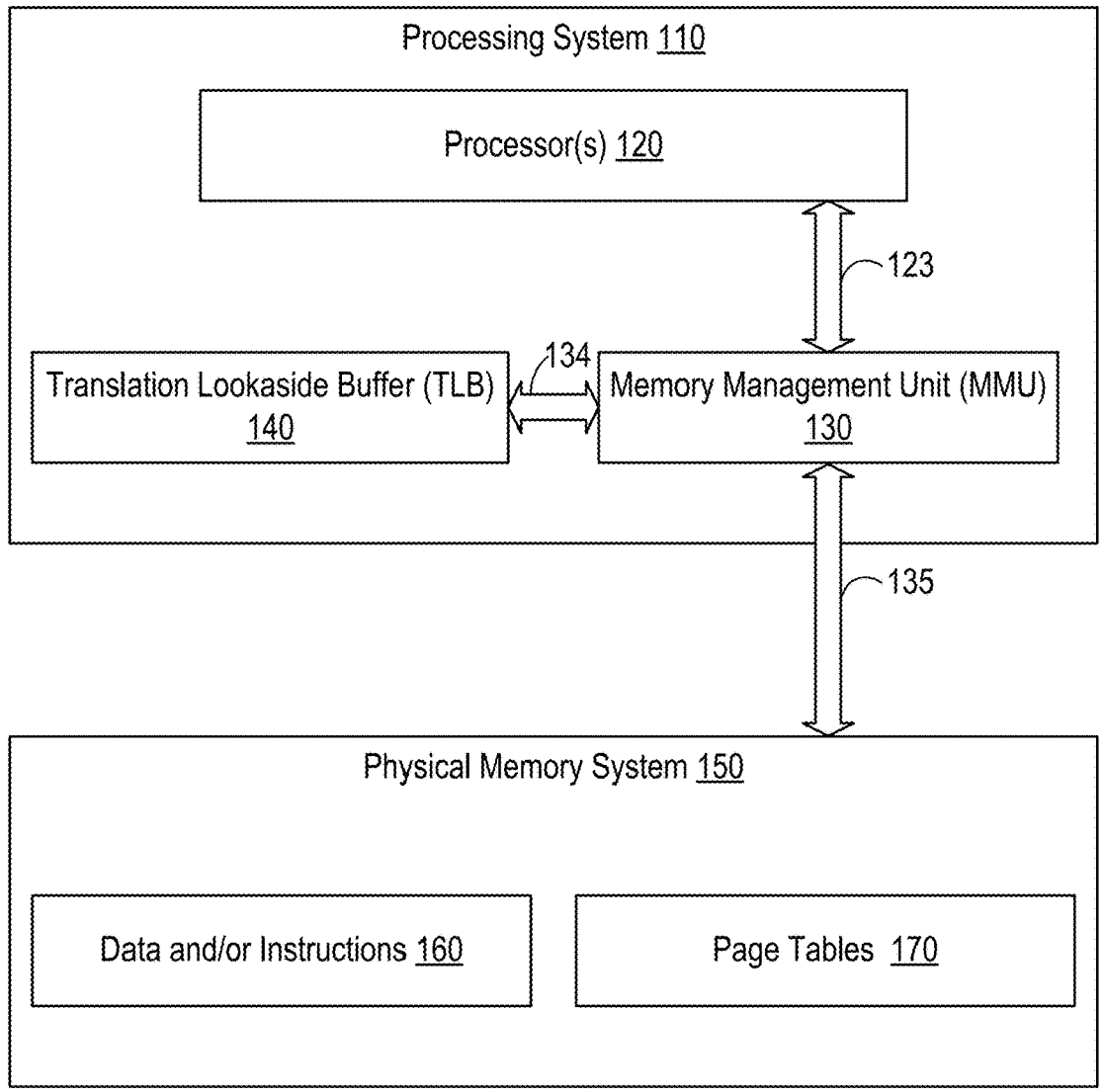
FIG. 1 illustrates an example computing environment for translation lookaside buffer (TLB) compression according to various aspects of the present disclosure.

Aspects of the present disclosure provide apparatuses, methods, processing systems, and computer-readable mediums for translation lookaside buffer (TLB) compression.

Reducing the size of data stored in a TLB can allow larger numbers of mappings to be stored in the TLB while consuming smaller amounts of physical storage resources, thereby improving the performance and resource-efficiency of memory management, as described in more detail below with respect to FIG. 1. Accordingly, techniques described herein involve utilizing contiguity of virtual addresses (VAs) and physical addresses (PAs) to compress multiple VA to PA mappings into a single TLB entry that includes only one instance of shared bits of multiple PAs along with other bits that are not shared across the multiple PAs. Thus, embodiments of the present disclosure allow for compression of both the VA portion and the PA portion of TLB entries based on contiguity that exists among VAs and PAs without making changes to such VAs, PAS, memory page sizes, and/or the like.

As described in more detail below with respect to FIG. 2, multiple contiguous VAs (e.g., corresponding to multiple contiguous virtual memory pages) may be compressed into a single tag, and the single tag may be associated in a single entry of the TLB with the multiple PAs (e.g., in consecutive order) to which the multiple VAs are mapped. Two VAs may be contiguous when they point to virtual memory pages that are immediately adjacent to one another in virtual storage space.

Furthermore, as described in more detail below with respect to FIG. 3, the multiple PAs (e.g., corresponding to multiple consecutive physical memory pages) may be compressed by identifying bits that are shared between the multiple PAs, such as common bits of the physical memory addresses themselves and/or bits representing shared attributes and/or other shared data, and storing those shared bits only once for all of the multiple PAs in the TLB entry, while storing other bits that are not shared between the multiple PAs separately within the same TLB entry. Two PAs may be contiguous when they point to physical memory pages that are immediately adjacent to one another in physical storage space. Additionally, a TLB entry as described herein may include two or more data banks for storing PA data, and each data bank may be used to store a respective pairing of shared bits of a respective consecutive group of PAs with differing bits of the respective consecutive group of PAs. Thus, for example, a TLB entry according to techniques described herein may include a tag that represents a plurality of VAs (e.g., eight consecutive VAs), associated with (1) a first data bank that includes one instance of shared bits of a first plurality of PAs (e.g., four consecutive PAs) to which a first portion of the plurality of VAs are mapped along with differing bits of the first plurality of PAs and (2) a second data bank that includes a single instance of shared bits of a second plurality of PAs (e.g., four consecutive PAs that may, for instance, immediately follow the four consecutive PAs represented in the first data bank) to which a second portion of the plurality of VAs are mapped along with differing bits of the second plurality of PAs.

As described in more detail below with respect to FIG. 3, certain aspects may involve selecting between alternative modes of TLB compression based on one or more criteria. For example, when a device and/or operating system (OS) is started or booted (or restarted), a determination may be made of whether there is a certain amount of PA contiguity and/or certain amounts of shared bits between contiguous PAs to warrant the PA compression techniques described herein (e.g., with respect to FIG. 3). If the one or more criteria are met, then both VA and PA compression techniques described herein (e.g., with respect to FIG. 3) may be used. Otherwise, if the one or more criteria are not met, then the VA compression techniques described herein (e.g., with respect to FIG. 2) may be used without the additional PA compression techniques described herein (e.g., with respect to FIG. 3). Such a determination may be made each time the device and/or OS starts or restarts, such that one compression technique may be used prior to a device/OS reset while another compression technique may be used after the device/OS reset.

Aspects of the present disclosure provide multiple technical improvements with respect to existing techniques for memory management. For example, by utilizing VA and PA contiguity to compress multiple VAs and multiple PAs into a single TLB entry, techniques described herein reduce computing resource utilization associated with storing and/or accessing the TLB, allow a larger number of mappings to be stored in the TLB, increase the amount of physical memory accessible from the TLB (the TLB reach), and/or reduce the size of the TLB, and thereby improve the functioning of computing devices and processes involved by improving the efficiency of memory accesses and/or freeing memory resources for other purposes. Identifying shared bits between multiple PAs and storing only instance of these shared bits along with the separate, differing bits of the multiple PAs in a TLB entry reduces the amount of storage resources utilized and thereby allows a larger number of mappings to be stored in a single TLB entry without utilizing additional storage resources. TLB compression techniques described herein, therefore, reduce the effective area of a TLB and/or improve the memory management performance that can be achieved without increasing the effective area of a TLB and/or the memory page size. These improvements are particularly advantageous in contexts where computing resources are limited and/or where memory management performance is key, such as in the context of mobile devices, machine learning, and/or the like.

Example Computing Environment for TLB Compression

FIG. 1 illustrates an example computing environment 100 for translation lookaside buffer (TLB) compression according to various aspects of the present disclosure. Computing environment 100 includes a processing system 110, which generally represents a physical computing device or a virtual computing device that runs a on a physical computing device. Processing system 110 includes one or more processors 120, which may represent central processing units (CPUs), graphics processing units (GPUs), and/or other processing devices configured to execute instructions to perform various computing operations.

A processor interconnect 123 may couple the processor(s) 120 to a memory management unit (MMU) 130 of the processing system 110. As describe in more detail below, the MMU 130 may perform translation of virtual memory addresses into physical memory addresses. The MMU 130 may be coupled to a TLB 140 of the processing system 110 via a TLB path 134. The TLB 140 may include mappings of virtual memory addresses to physical memory addresses that have been compressed according to aspects of the present disclosure.

Computing environment 100 further includes a physical memory system 150, which may comprise data and/or instructions 160 and page tables 170. The physical memory system 150 may be, for example random access memory (RAM). The MMU 130 may be coupled to the physical memory system 150 via a physical memory interconnect 135 such as a CPU/memory interconnect (CMI).

The page tables 170 map each virtual (memory) address used by the processing system 110 to a corresponding physical (memory) address associated with the physical memory system 150. The physical address may be located in the physical memory system 150, a hard drive (not shown), or some other storage component. When the processing system 110 needs data (and/or instructions-jointly referred to as data in the following), the processor(s) 120 may send the virtual address of the requested data to the MMU 130. The MMU 130 may perform the translation in tandem with the TLB 140 and/or physical memory system 150 and then return the corresponding physical address to the processor(s) 120. The physical memory system 150 may, for instance, be involved in the address translation in case of a TLB miss leading to a so-called page walk as described below.

To perform the translation, the MMU 130 first checks the TLB 140 to determine if the virtual address of the requested data matches a virtual address associated with one of the TLB entries. If there is a match between the requested virtual address and a virtual address in a particular TLB entry, the processing system checks the TLB entry to determine whether a valid bit is set. If the entry is valid, then the TLB entry includes a valid translation of the virtual address. Accordingly, a corresponding physical address can be returned very quickly to the MMU, thereby completing the translation. Using the translated physical address, the processing system 110 can retrieve the requested data.

If the MMU 130 determines that the virtual address of the requested data does not match a virtual address associated with one of the TLB entries (or if a matching TLB entry is marked as invalid), then the MMU 130 may walk through the page tables 170 in the physical memory system 150 until a matching virtual address is found.

Each translation may be performed in levels. For example, the MMU 130 may walk through a first page table of the page tables 170 in search of a match. A matching entry found in the first page table may include the first several bits of a physical address and an indication that additional bits may be found in a second page table of the page tables 170. The MMU 130 may then store the first several bits and walk through the second page table in search of a match. As noted above, the matching entry may include the next several bits of the physical address, and the process repeats if the matching entry includes an indication that additional bits may be found in a third page table of the page tables 170. The process may repeat until the matching entry indicates that a last level of translation has been reached. The last level may be, for example, the level that was most-recently reached. Once the last level of translation has been completed, the MMU 130 should have a complete translation of the full physical address.

If there is a match between the requested virtual address and a virtual address in a particular page table entry, the processing system 110 retrieves a physical address from the page table entry. Once found, the physical address is returned to the MMU 130. However, using the page tables 170 to perform the translation may be much slower than using the TLB 140. The TLB 140 is smaller than the physical memory system 150 and less remote than the physical memory system 150. Accordingly, the TLB 140 may be searched more quickly. The TLB 140 typically replicates a subset of the translations located in the page tables 170. The replicated translations are generally associated with virtual addresses that are most important, most frequently-used, and/or most recently-used. By way of example, the above mentioned page table entry that was found during the walk through the page table(s) may be stored in the TLB as a recent translation of the corresponding virtual address to the corresponding physical address.

Conventionally, each entry in the TLB 140 may include a single mapping of a virtual address (VA) corresponding to a virtual memory page to a physical address (PA) corresponding to a physical memory page. However, it is generally advantageous to reduce the amount of storage space utilized to store mappings of VAs to PAs in the TLB 140, such as to reduce the size of the TLB 140 and/or to store a larger number of such mappings in the TLB 140 without increasing a size of the TLB 140. Accordingly, techniques described herein (e.g., below with respect to FIGS. 2 and 3) involve compressing the VAs and/or PAs in such mappings based on address/page contiguity, including based on bits that are shared between multiple PAs (e.g., corresponding to multiple contiguous physical memory pages), in order to store multiple VA to PA mappings in a single entry of the TLB 140.

Example TLB Compression

Figure 2:
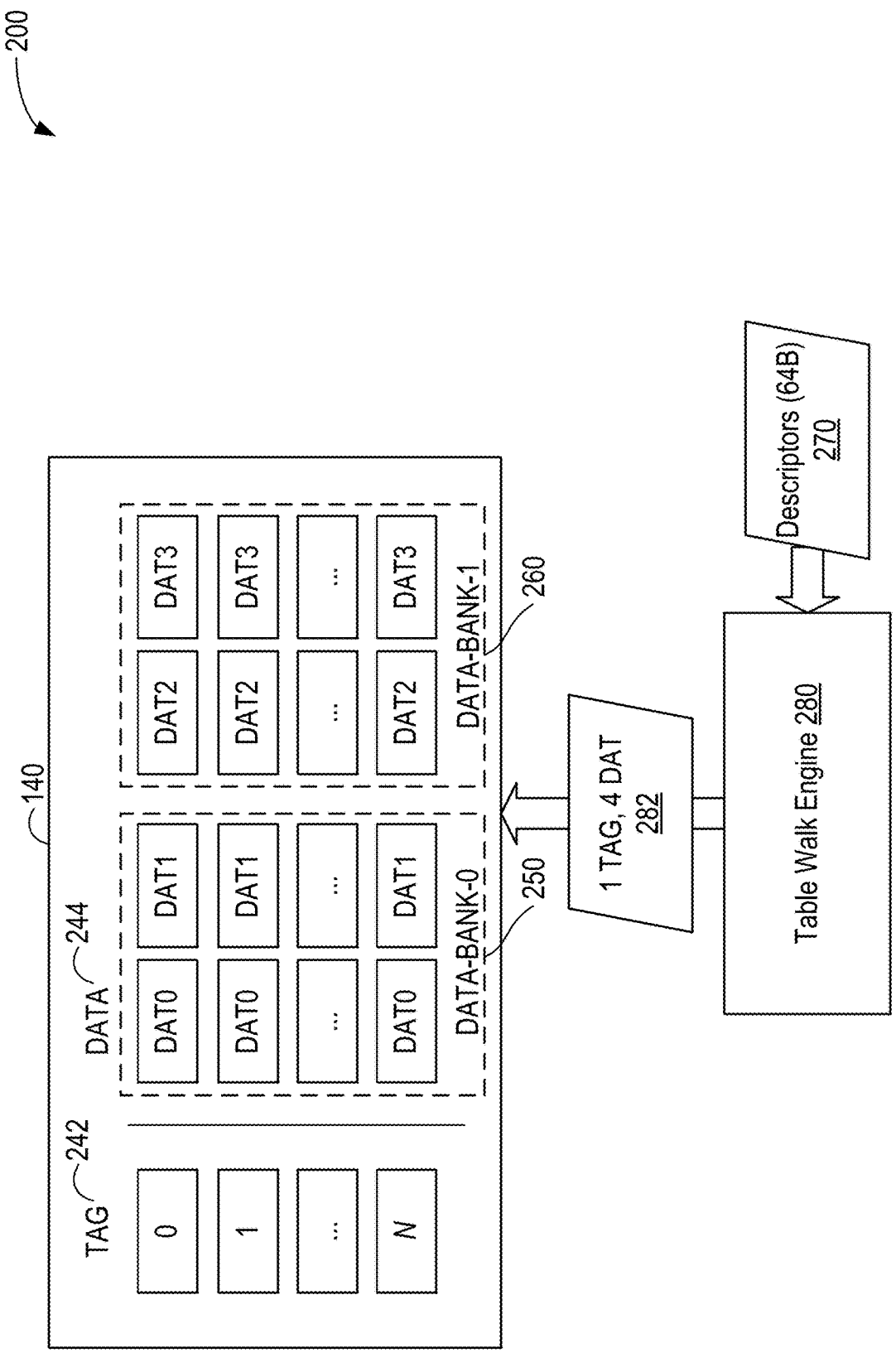
FIG. 2 illustrates an example of TLB compression according to various aspects of the present disclosure.

FIG. 2 is an illustration 200 of an example of TLB compression according to various aspects of the present disclosure. In particular, illustration 200 represents an example technique of compressing entries of a TLB, and includes TLB 140 of FIG. 1. Illustration 200 generally involves compressing multiple VAs into a single tag that is then associated with multiple PAs in a single entry of TLB 140.

Illustration 200 may represent a first of two TLB compression techniques that may be selected for use in a processing system based on one or more criteria, as described in more detail below with respect to FIG. 4. For example, the technique described with respect to FIG. 2 may be selected when there is less than a target amount of PA contiguity and/or less than a target amount of sharing of bits between contiguous PAs that would otherwise warrant the use of the technique described below with respect to FIG. 3.

A (page) table walk engine 280 may be a component of MMU 130 of FIG. 1 and/or may represent functionality performed by MMU 130 of FIG. 1 with respect to walking through page tables and/or TLB 140 to identify mappings of VAs to PAs and, in some aspects, storing such mappings in TLB 140 as appropriate.

Table walk engine 280 may retrieve a series of descriptors 270 (e.g., from one or more page tables), each of which may include a PA and attributes for accessing a particular physical memory page that is mapped to a particular VA of a virtual memory page. For example, table walk engine 280 may retrieve descriptors 270 from a page table 170 of FIG. 1 based on a VA included in a request from a processor 120 of FIG. 1. Each of descriptors 270 may have a size of 64 bits, as an example.

Table walk engine 280 may then generate one or more entries in TLB 140, such as entry 282, based on descriptors 270. For example, table walk engine 280 may compress a series of contiguous VAs (i.e., consecutive VAs corresponding to a contiguous region of virtual memory) into a single tag that is representative of the series of VAs, and may associate that tag within entry 282 with the series of descriptors (e.g., each of which may include a PA and optionally one or more associated attributes such as a valid bit and/or a dirty bit and/or other attributes as disclosed below with respect to FIG. 3) of the physical memory pages to which the series of VAs are mapped. The series of descriptors may generally be referred to as TLB data in some embodiments. Thus, for example, entry 282 may include one tag (e.g., representative of four VAs) and four data portions (e.g., descriptors representative of the four physical memory pages that are mapped to the four VAs).

TLB 140 includes a plurality of entries, each of which may contain a tag 242 associated with a data portion 244. Each data portion 244 may be divided across two data banks 250 and 260 or may be provided in a single data bank (not shown). Each tag 242 may be representative of multiple (e.g., 4) contiguous VAs, such as including the first (e.g., in order of increasing VAs) of the multiple contiguous VAs (e.g., the MMU may be configured to recognize that the VA included in each tag is the first of a given number of such contiguous VAs represented by the tag). Each data bank 250 and 260 may, for example, store 128 bits for each entry, such as corresponding to two 64 bit descriptors per data bank. It is noted that the numbers of bits mentioned herein are included as examples, and other numbers of bits are possible. Thus, in such an example, a given tag 242 (e.g., tag 0) may be associated with data 244 including a first two data blocks (e.g., DAT0 and DAT1) in a first data bank 250 (e.g., DATA-BANK-0) and a second two data blocks (e.g., DAT2 and DAT3) in a second data bank 260 (e.g., DATA-BANK-1), with each data block corresponding to a descriptor 270 and including a PA and, in some aspects, one or more attributes associated with the PA.

When looking up a given VA (e.g., of requested data) in TLB 140, the MMU may determine whether any tag 242 in TLB 140 matches the given VA or whether any tag 242 in TLB 140, when incremented by one, two, or three (e.g., corresponding to the four associated PAs), matches the given VA (e.g., because each tag may be a compressed tag that is representative of four contiguous VAs including the VA that matches the tag and the three VAs immediately following that VA). In general, for a TLB entry with M descriptors or data blocks (M being an integer larger than 1) corresponding to M respective PAs, matching is performed within a range of M VAs, e.g., starting with the VA corresponding to the respective tag 242 of the TLB entry (e.g., in increasing order). If a match is found, then the corresponding data block from the data 244 associated with the particular tag 242 may be retrieved. For example, if the particular tag 242 matches the given VA, then the first data block (e.g., DAT0) may be retrieved. If the particular tag 242, when incremented by one, matches the given VA, then the second data block (e.g., DAT1) may be retrieved. If the particular tag 242, when incremented by two, matches the given VA, then the third data block (e.g., DAT2) may be retrieved. If the particular tag 242, when incremented by three, matches the given VA, then the fourth data block (e.g., DAT3) may be retrieved. This is included as an example, and other techniques of identifying matches and retrieving applicable data from TLB 140 may be employed.

The compression technique described with respect to FIG. 2 involves compressing multiple VAs into a single tag while storing the PAs associated with the VAs (e.g., the descriptors that include the PAs) in their entirety in association with the tag in TLB 140. Because the PAs are stored in their entirety in such techniques, the PAs do not need to necessarily correspond to contiguous physical memory. However, in the case of contiguous PAs or even PAs sharing one or more bits such as one or more most significant bits (MSBs), further resource efficiency may be achieved by additionally compressing the data portion of the TLB (e.g., the PAs and associated attributes that are stored in association with tags), as described below with respect to FIG. 3.

Figure 3:
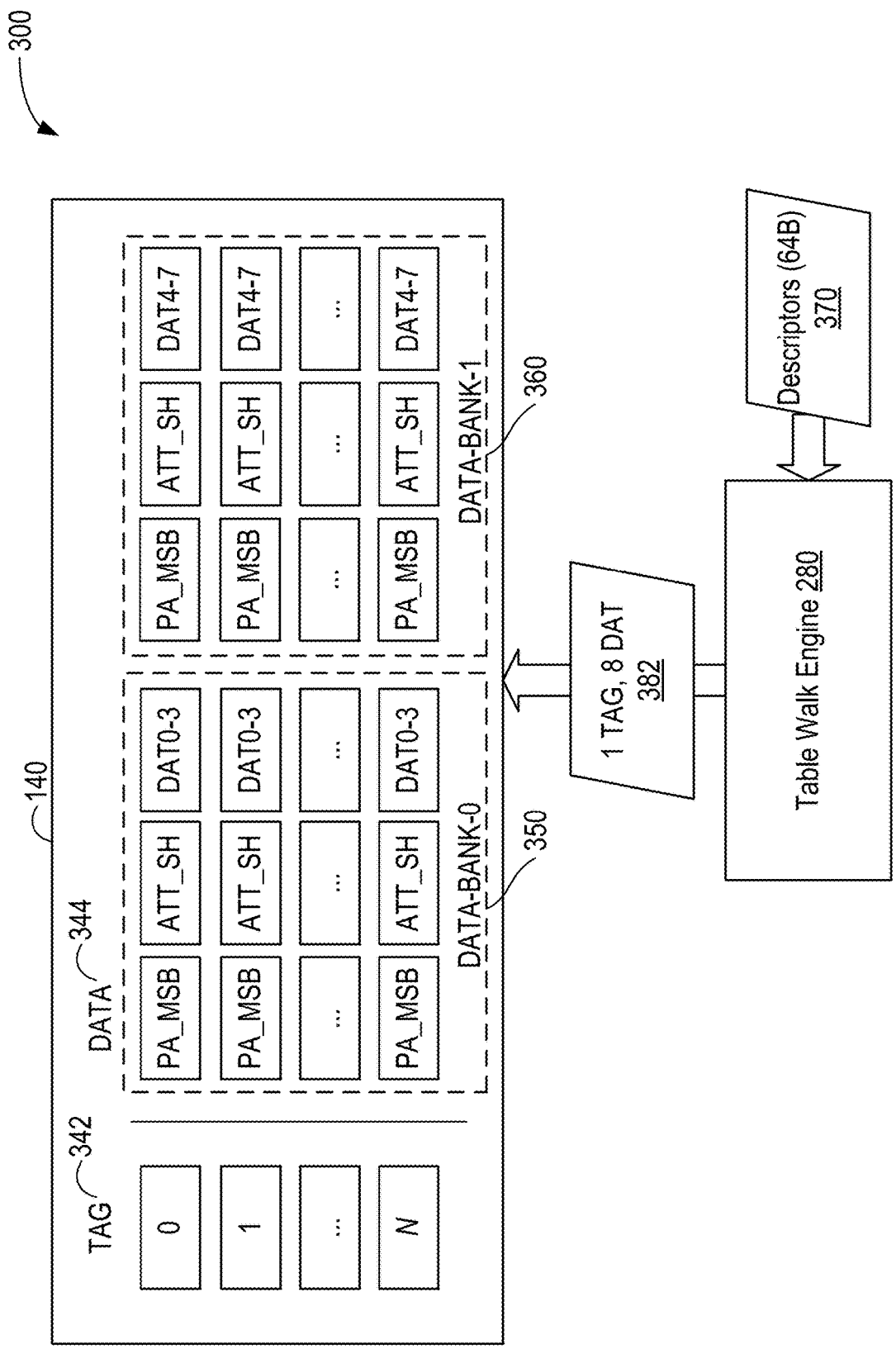
FIG. 3 illustrates another example of TLB compression according to various aspects of the present disclosure.

FIG. 3 is an illustration 300 of an example of TLB compression according to various aspects of the present disclosure. In particular, illustration 300 represents an example technique of compressing entries of a TLB, and includes TLB 140 of FIG. 1. Illustration 300 generally involves compressing multiple VAs into a single tag (as described above with respect to FIG. 2) that is then associated with multiple PAs in a single entry of TLB 140, and also compressing the multiple PAs (and, in some aspects, associated attributes) in order to store a larger number of PAs in each TLB entry.

Illustration 300 may represent a second of two alternative TLB compression techniques that may be selected for use in a processing system based on one or more criteria, as described in more detail below with respect to FIG. 4. For example, the technique described with respect to FIG. 3 may be selected when there is a target amount of PA contiguity and/or a target amount of sharing of bits between contiguous PAs. In the present disclosure, sharing of bits between PAs is to be generally understood as sharing a number Q of most significant bits (MSBs) of the descriptors (which may include PAs of the respective physical memory pages such as the physical page frame numbers without the page offset) where Q is an integer. In other words, a descriptor of total size P bits may be divided into Q shared MSBs plus R non-shared/remaining least significant bits (LSBs) (i.e., P=Q+R).

Illustration 300 includes table walk engine 280 of FIG. 2, which may be a component of MMU 130 of FIG. 1 and/or may represent functionality performed by MMU 130 of FIG. 1 with respect to walking through page tables and/or TLB 140 to identify mappings of VAs to PAs and, in some aspects, storing such mappings in TLB 140 as appropriate.

Table walk engine 280 may retrieve a series of descriptors 370 (e.g., from one or more page tables), each of which may include a PA and attributes for accessing a particular physical memory page that is mapped to a particular VA of a virtual memory page. For example, table walk engine 280 may retrieve descriptors 370 from a page table 170 of FIG. 1 based on a VA included in a request from a processor 120 of FIG. 1. Each of descriptors 370 may have a size of 64 bits, as an example.

Table walk engine 280 may then generate one or more entries in TLB 140, such as entry 382, based on descriptors 370. For example, as described above with respect to FIG. 2, table walk engine 280 may compress a series of contiguous VAs (i.e., consecutive VAs corresponding to a contiguous region of virtual memory) into a single tag that is representative of the series of VAs, and may associate that tag within entry 382 with the series of descriptors (e.g., each of which may include a PA and optionally one or more associated attributes such as security attributes, memory type, permissions, access flags, dirty states, valid states, and/or other attributes) of the physical memory pages to which the series of VAs are mapped.

Furthermore, table walk engine 280 may compress the series of descriptors based on the series of descriptors sharing one or more bits and/or attributes. In some aspects, the series of descriptors may be contiguous with one another, i.e., correspond to consecutive PAs (e.g., physical memory frame numbers) of a contiguous physical address space. In this case, the PAs of the series of descriptors may share one or more MSBs while the LSB(s) are incremented from one descriptor to the next. Alternatively or additionally, the descriptors may share one or more attributes. In some aspects, security attributes, memory type, permissions, access flags, dirty states, valid states, and/or other attributes of the descriptors may be shared. For example, table walk engine 280 may store shared bits and/or attributes of the series of descriptors only once in entry 382 along with other bits and/or attributes of the series of descriptors that are not shared across the series of descriptors. In other words, while shared bits and/or (shared bits of) attributes of the series are stored only once, respective non-shared/differing bits and/or (non-shared/differing bits of) attributes are stored for each of the descriptors. Contiguous PAs (e.g., PAs associated with physical memory pages that are adjacent to one another in the physical storage space) often share common bits, such as the most significant bits (MSBs) of the PAs, as well as common attributes, such as permissions and/or the like. Thus, this contiguity of PAs may be used to perform compression by including only a single instance of these shared bits and/or attributes in entry 382 along with the other, non-shared bits and/or attributes. In some aspects, the compression may be limited to the shared bits while some or all attributes such as dedicated valid and/or dirty bits are stored separately for each descriptor (i.e., PA).

Thus, for example, entry 382 may include one tag (e.g., representative of eight VAs) and a single instance of shared bits and/or attributes of eight data portions (e.g., descriptors representative of the eight physical memory pages that are mapped to the eight VAs) along with the other, non-shared bits and/or attributes of the eight data portions. The compression of the descriptors may allow for a larger number of mappings (e.g., eight rather than four) to be stored in a single TLB entry without utilizing additional storage space.

TLB 140 includes a plurality of entries, each of which may contain a tag 342 associated with a data portion 344. Each data portion 344 may be divided across two data banks 350 and 360 or be provided in a single data bank (not shown). Each tag 342 may be representative of multiple (e.g., 8) contiguous VAs, such as including the first (e.g., in order of increasing VAs) of the multiple contiguous VAs (e.g., the MMU may be configured to recognize that the VA included in each tag is the first of a given number of such contiguous VAs represented by the tag). Each data bank 350 and 360 may, for example, store 128 bits for each entry, such as corresponding to four 64 bit descriptors (compressed as described herein such that the four 64 bit descriptors are represented by 128 bits) per data bank. It is noted that the numbers of bits mentioned herein are included as examples, and other numbers of bits are possible. Thus, in such an example, a given tag 342 (e.g., tag 0) may be associated with data 344 including shared bits (e.g., PA_MSB, meaning the most significant bits of the PAs) of a first four data blocks and/or shared attributes (e.g., ATT_SH, meaning shared attributes) of the first four data blocks, and the remaining, non-shared, portions of the first four data blocks (e.g., DAT0, DAT1, DAT2, and DAT3) in a first data bank 350 (e.g., DATA-BANK-0) and shared bits (e.g., PA_MSB) of a second four data blocks, shared attributes (e.g., ATT_SH) of the second four data blocks, and the remaining, non-shared, portions of the second four data blocks (e.g., DAT4, DAT5, DAT6, and DAT7) in a second data bank 360 (e.g., DATA-BANK-1), with each data block corresponding to a descriptor 370 and including a PA and, in some aspects, one or more attributes associated with the PA. Shared bits may refer to the n most significant bits of each of a plurality of PAs (e.g., the respective physical memory frame numbers) (e.g., when the n most significant bits are shared across these PAs), while shared attributes may refer to memory attributes associated with these PAs (e.g., in descriptors) that are shared across the PAs. Shared attributes may also be referred to as shared bits, as the attributes are also represented by bits. Examples of attributes may include, for example, security attributes, memory type, permissions, access flags, dirty states, valid states, and/or the like. Certain attributes such as security attributes, memory type, and permissions are more likely to be shared across multiple contiguous PAs, while other attributes such as an access flag and a dirty state are generally not shared across multiple PAs.

Determining how many bits (e.g., how many most significant PA bits and/or how many attribute bits) should be shared across a series of contiguous descriptors in order for the series of contiguous descriptors to be compressed in such a manner as to be stored in a single TLB entry may involve a formula. For example, the following formula may be solved for the number n of shared most significant bits (e.g., $PA_{MSBS}$) and/or the number $ATTR_{sh}$ of shared attribute bits per descriptor:

$$DataBank_{SIZE}=n+(PA_{SIZE}-n)*M+ATTR_{sh}+M*ATTR_{pv},$$

where $DataBank_{SIZE}$ is the number of bits that can be stored in a data bank (e.g., data bank 350 or 360), $PA_{SIZE}$ is the total number of bits in a PA, M is the number of descriptors to be stored in a given data bank for a given TLB entry (which may be calculated as M=Degree/2 for the illustrative example of two banks, where degree is the total number of VA to PA mappings to be compressed into a single TLB entry), and $ATTR_{pv}$ is the number of non-shared (e.g., private) attribute bits for each descriptor.

For example, when $DataBank_{SIZE}=128$, $PA_{SIZE}=40$, M=4, there are 4 non-shared attribute bits per descriptor (e.g., $ATTR_{PV}=4$), and there are 23 total attribute bits per descriptor (e.g., meaning that $ATTR_{SH}=19$), then the formula above may be solved for n as follows:

$$128=n+(40-n)*4+19+4*4.$$

Solving the above formula may produce a value of n=ceiling (22.333)=23 bits. Thus, in such a case, a given four contiguous descriptors may be compressed for storage in a given data bank 350 or 360 if the four contiguous descriptors share 4 attribute bits and share (at least) 23 PA bits (e.g., most significant bits).

Table walk engine 280 may only store contiguous descriptors together in a single TLB entry if they share (at least) n most significant PA bits and $ATTR_{SH}$ bits of shared attributes. Otherwise, the descriptors will be stored in separate entries. Thus, it may be advantageous to only use the TLB compression technique described with respect to FIG. 3 in cases where there is a target amount of PA contiguity (leading to a significant number n of shared PA MSBs) and a target amount of shared bits between descriptors, as described in more detail below with respect to FIG. 4. It is noted that the PAs need not necessarily be consecutive in the sense of representing a range of PAs with increments of one between consecutive PAs. Other (larger) increments are possible, i.e., stride physical memory access with strides larger than 1 (as they often occur with memory requests by a GPU), as long as the number n of shared PA bits is sufficiently large.

When looking up a given VA (of requested data) in TLB 140, the MMU may determine whether any tag 342 in TLB 140 matches the given VA or whether any tag 342 in TLB 140, when incremented by one, two, three, four, five, six, or seven matches the given VA. In general, for a TLB entry with M descriptors or data blocks (M being an integer larger than 1) corresponding to M respective PAs, matching is performed within a range of M VAs, e.g., starting with the VA corresponding to the respective tag 342 of the TLB entry (e.g., in increasing order). If a match is found, then the relevant data from the data 344 associated with the particular tag 342 may be determined. For example, if the particular tag 342 matches the given VA, then the non-shared bits of the first data block (e.g., DAT0) from the first data bank 350 may be retrieved and combined with the PA_MSB and ATTR_SH from that data bank. If the particular tag 342, when incremented by one, matches the given VA, then the second data block (e.g., DAT1) from the first data bank 350 may be retrieved and combined with the PA_MSB and ATTR_SH from that data bank. If the particular tag 342, when incremented by two, matches the given VA, then the third data block (e.g., DAT2) from the first data bank 350 may be retrieved and combined with the PA_MSB and ATTR_SH from that data bank. If the particular tag 342, when incremented by three, matches the given VA, then the fourth data block (e.g., DAT3) from the first data bank 350 may be retrieved and combined with the PA_MSB and ATTR_SH from that data bank. If the particular tag 342, when incremented by four, matches the given VA, then the non-shared bits of the first data block (e.g., DAT4) from the second data bank 360 may be retrieved and combined with the PA_MSB and ATTR_SH from that data bank. If the particular tag 342, when incremented by five, matches the given VA, then the second data block (e.g., DAT5) from the second data bank 360 may be retrieved and combined with the PA_MSB and ATTR_SH from that data bank. If the particular tag 342, when incremented by six, matches the given VA, then the third data block (e.g., DAT6) from the second data bank 360 may be retrieved and combined with the PA_MSB and ATTR_SH from that data bank. If the particular tag 342, when incremented by seven, matches the given VA, then the fourth data block (e.g., DAT7) from the second data bank 360 may be retrieved and combined with the PA_MSB and ATTR_SH from that data bank.

This is included as an example, and other techniques of identifying matches and retrieving applicable data from TLB 140 may be employed.

It is noted that the particular examples described herein with respect to sizes of data banks, numbers of data banks, numbers of descriptors stored per data bank and/or TLB entry, sizes of descriptors, numbers of shared PA bits and/or shared attribute bits, types of shared and/or private attributes, and/or the like, are included as examples and other variations are possible. By way of example, a single data bank may be provided such that only one instance of PA_MSB and ATTR_SH is stored for the series of descriptors. In other aspects, more than two, e.g., four or eight, data banks may be provided such that for each of the data banks a dedicated instance of PA_MSB and ATTR_SH is stored. Providing a plurality of data banks in the data portion of the TLB entry may reduce the contiguity requirement for the associated series of descriptors (e.g., PAs) at the cost of storing multiple instances of shared bits.

Example Selection Between TLB Compression Techniques

Figure 4:
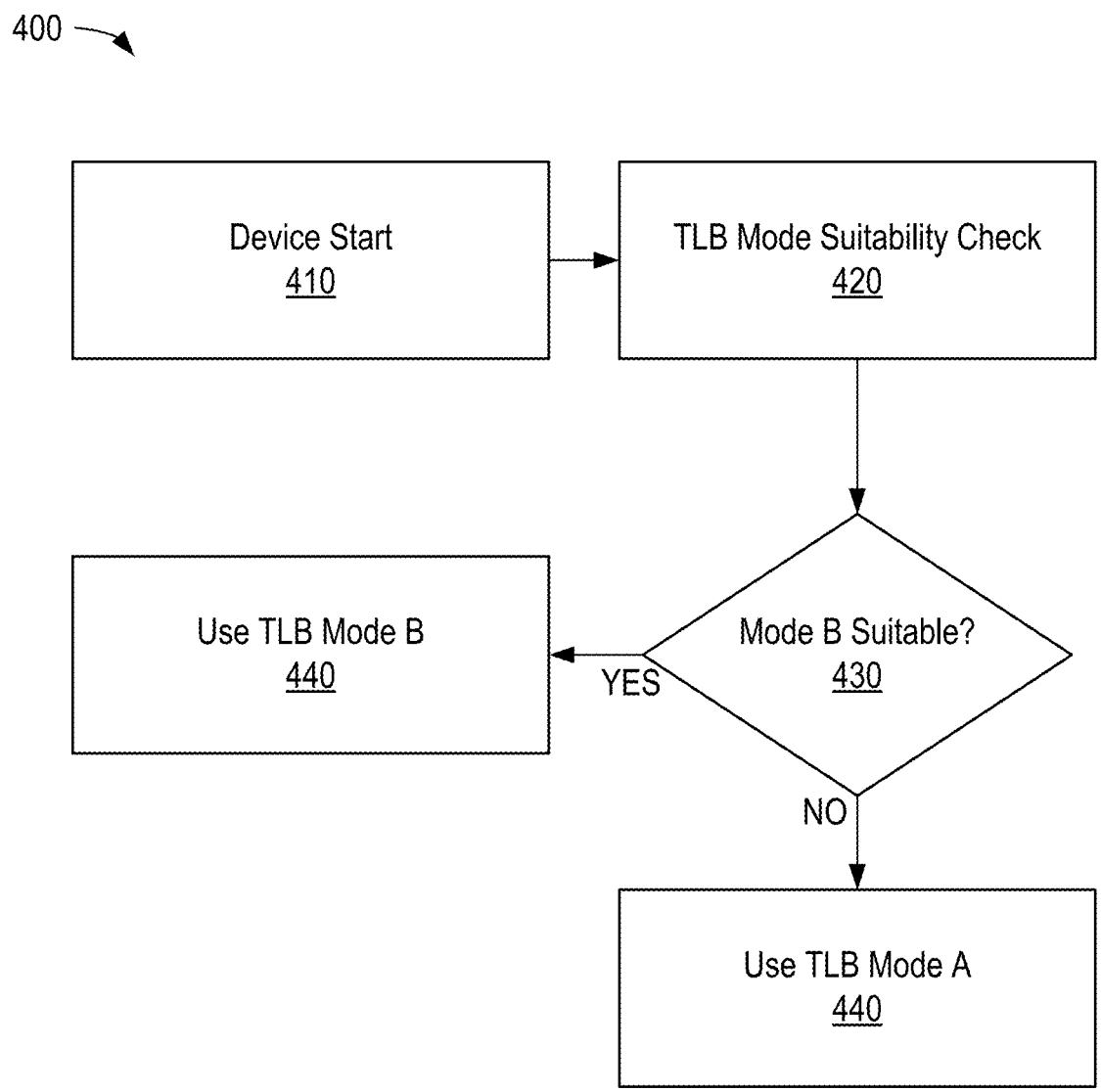
FIG. 4 is a flow diagram depicting an example of selecting between TLB compression techniques according to various aspects of the present disclosure.

FIG. 4 is a flow diagram 400 depicting an example of selecting between TLB compression techniques according to various aspects of the present disclosure. Flow diagram 400 may, for example, represent operations performed by an MMU such as MMU 130 of FIG. 1, and may relate to selecting between the TLB compression technique described above with respect to FIG. 2 and the TLB compression technique described above with respect to FIG. 3.

At block 410, a device start may occur. For example, a device, operating system (OS), and/or hypervisor may be powered on and/or booted.

At block 420, a TLB mode suitability check is performed. The TLB mode suitability check may involve determining whether one or more conditions are met such that the TLB compression technique described above with respect to FIG. 3 (e.g., Mode B, involving compressing the PA portion in addition to the VA portion of TLB entries) is suitable. The one or more conditions may relate to PA contiguity and/or sharing of bits between PAs and/or attributes associated with PAs.

For example, different types of platforms (e.g., OSes and/or hypervisors) may use different algorithms to map VAs to intermediate PAs (IPAs) and to map IPAs to PAs. Some algorithms are more likely than others to produce PA contiguity and/or sharing of bits associated with PAs. As such, the TLB mode suitability check may involve determining which algorithms are used for mapping VAs to PAs. Additionally or alternatively, the TLB mode suitability check may involve determining whether a target amount of PA contiguity is present in the physical memory system (e.g., if a certain percentage, proportion, or other measure of contiguity is present), which may be based on analyzing a sample subset of page table entries. In some aspects, a size of the sample subset of page table entries may correspond to the above described target range of contiguous VAs, e.g., four or eight. Additionally or alternatively, the TLB mode suitability check may involve determining whether a target amount of bit sharing between descriptors is present (e.g., if a certain percentage, proportion, or other measure of bit sharing is present), which may be based on analyzing a sample subset of page table entries. In one example, a determination is made of whether a certain percentage of descriptors (e.g., of all PAs or of a sample subset of PAs) include a given number of shared bits. In some cases, the TLB mode suitability check may involve determining whether sets of a given number of descriptors (e.g., based on a sample subset of (e.g., consecutive) page table entries) share a particular number of PA bits and/or attribute bits, such as based on the formula discussed above with respect to FIG. 3. If a sufficient percentage or proportion of descriptors (e.g., of all PAs or a sample subset of PAs) include a given number of shared bits, then the TLB may be formatted according to the VA and PA compression techniques described herein and PA compression techniques described herein may be used for sets of contiguous PAs that share the given number of bits while other techniques (e.g., only VA compression techniques and/or uncompressed techniques) may be used for PAs that are not part of a contiguous series of PAs that share the given number of common bits.

At block 430, a determination is made of whether the TLB compression technique described above with respect to FIG. 3 (e.g., Mode B) is suitable, such as based on the TLB mode suitability check performed at block 420. If Mode B is suitable (e.g., if one or more conditions described above with respect to block 420 are met), then operations proceed to block 440, where Mode B is utilized. Otherwise, if Mode B is not suitable (e.g., if the one or more conditions described above with respect to block 420 are not met), then operations proceed to block 440, where the TLB compression technique described above with respect to FIG. 2 (e.g., Mode A) is utilized.

In some aspects, the TLB mode selection technique described with respect to FIG. 4 may be performed each time the device, OS, and/or hypervisor starts or boots.

Example Method for TLB Compression

FIG. 5 is a diagram depicting an example method 500 for TLB compression, according to various aspects of the present disclosure. For example, method 500 may be performed by one or more components of processing system 110 and/or physical memory system 150 of FIG. 1 and/or by processing system 600 of FIG. 6, described below. Method 500 may relate to one or more of the TLB compression techniques described above with respect to FIGS. 2 and 3 and/or the TLB mode selection process described above with respect to FIG. 4.

Method 500 begins at block 505, with determining that a plurality of physical memory addresses, which are associated with a plurality of virtual memory addresses, are contiguous with one another and share one or more common address bits or one or more common attribute bits, wherein each respective physical memory address of the plurality of physical memory addresses corresponds to a separate respective physical memory page. For example, the one or more common address bits and/or the one or more common attribute bits may be in a descriptor of the physical memory address.

Method 500 continues at block 510, with generating a tag for an entry in a TLB, the tag representing the plurality of virtual memory addresses.

Method 500 continues at block 515, with associating, in the entry in the TLB, the tag with data comprising: a single instance of the one or more common address bits or the one or more common attribute bits of the plurality of physical memory addresses; and other bits of the plurality of physical memory addresses.

In some aspects, the tag indicates a virtual memory address arranged as a first virtual memory address in the plurality of virtual memory addresses.

In certain aspects, a number of virtual memory addresses in the plurality of virtual memory addresses is identical to a number of physical memory addresses in the plurality of physical memory addresses.

In some aspects, the data is stored in a first data bank of the entry in the TLB, and the method further comprises:

determining that an additional plurality of physical memory addresses, which are associated with an additional plurality of virtual memory addresses, are contiguous with one another and share one or more respective common address bits or one or more respective common attribute bits, wherein the additional plurality of physical memory addresses are contiguous with the plurality of physical memory addresses, and wherein the tag further represents the additional plurality of virtual memory addresses; and storing, in a second data bank of the entry in the TLB, additional data comprising a respective single instance of the one or more respective common address bits or the one or more respective common attribute bits of the additional plurality of physical memory addresses and respective other bits of the additional plurality of physical memory addresses.

In certain aspects, the plurality of virtual memory addresses are contiguous with one another. In some aspects, the one or more common attribute bits indicate at least one of a security attribute, a memory type, or a permission.

Some aspects further comprise using the entry in the TLB to retrieve any one of the plurality of physical memory addresses based on a corresponding virtual memory address of the plurality of virtual memory addresses.

Certain aspects further comprise, prior to generating the tag for the entry in the TLB, enabling a physical memory address compression mode based on determining that a condition has been met.

In some aspects, the determining that the condition has been met is based on determining that the plurality of physical memory addresses are contiguous with one another.

Certain aspects further comprise, after resetting a device associated with the plurality of virtual memory addresses and the plurality of physical memory addresses, disabling the physical memory address compression mode based on determining that the condition has not been met.

In some aspects, the plurality of virtual memory addresses comprise four or more virtual memory addresses, and wherein the plurality of physical memory addresses comprise a respective four or more physical memory addresses.

In certain aspects, the one or more common address bits comprise a one or more most significant bits of each of the plurality of physical memory addresses.

In some aspects, the other bits are not common to the plurality of physical memory addresses.

Method 500 allows a larger number of VA to PA mappings to be included in a single TLB entry, thereby reducing a size of the TLB and/or increasing an amount of mappings that can be stored in the TLB without increasing the size of the TLB. Accordingly, method 500 improves the efficiency of memory accesses and/or reduces the amount of storage resources utilized, and thereby improves the functioning of computing devices and processes involved.

Example Processing System for TLB Compression

Figure 6:
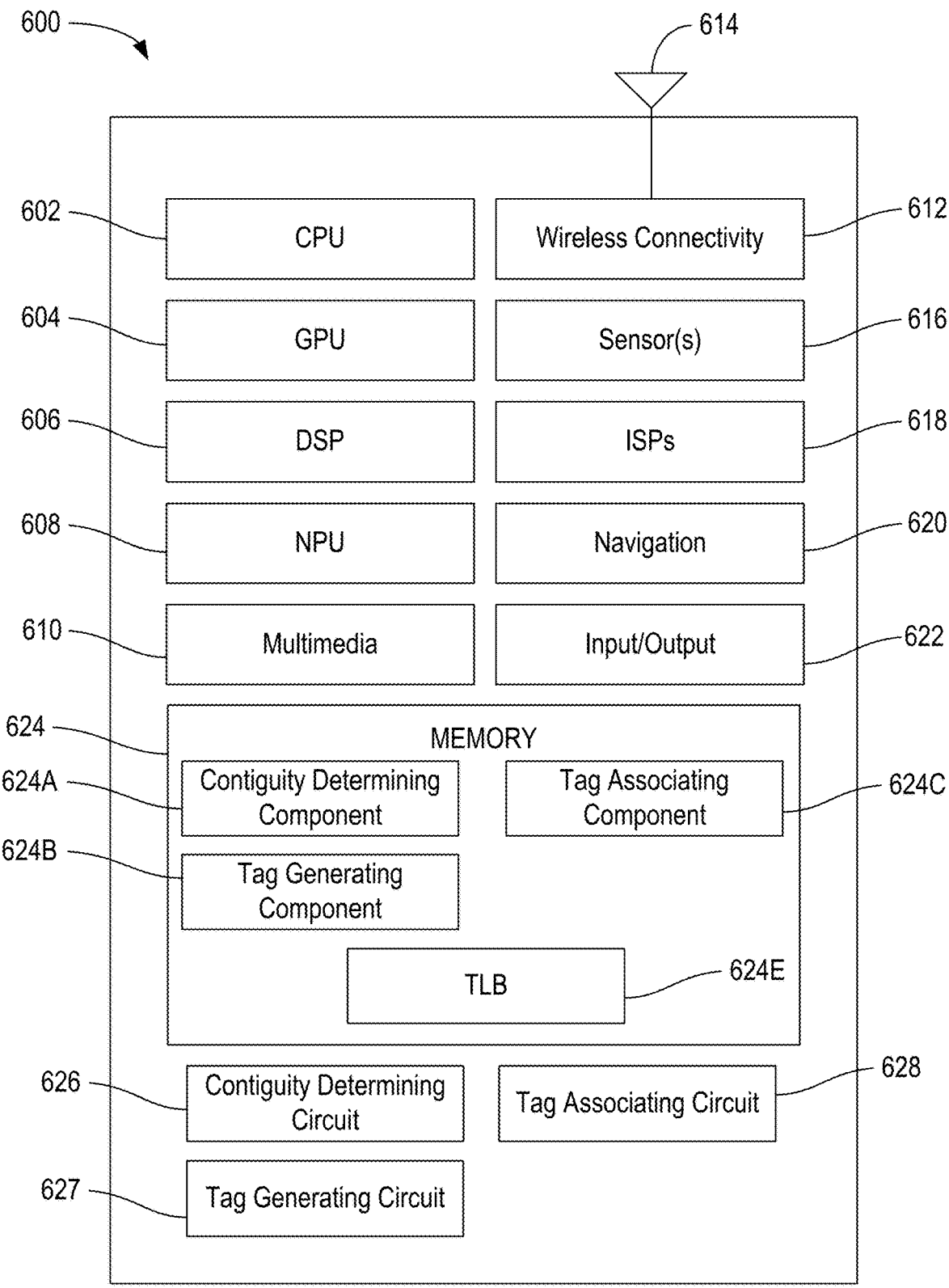
FIG. 6 depicts an example processing system configured to perform various aspects of the present disclosure.

In some aspects, the workflows, techniques, and methods described with reference to FIGS. 1-5 may be implemented on one or more devices or systems. FIG. 6 depicts an example processing system 600 configured to perform various aspects of the present disclosure, including, for example, the techniques and methods described with respect to FIGS. 1-5. In some aspects, the processing system 600 may correspond to processing system 110 and/or physical memory system 150 of FIG. 1. Although depicted as a single system for conceptual clarity, in some aspects, as discussed above, the operations described below with respect to the processing system 600 may be distributed across any number of devices or systems.

The processing system 600 includes a central processing unit (CPU) 602, which in some examples may be a multi-core CPU (e.g., corresponding to processor(s) 120 of FIG. 1). Instructions executed at the CPU 602 may be loaded, for example, from a program memory associated with the CPU 602 or may be loaded from a memory partition (e.g., a partition of memory 624).

The processing system 600 also includes additional processing components tailored to specific functions, such as a graphics processing unit (GPU) 604, a digital signal processor (DSP) 606, a neural processing unit (NPU) 608, a multimedia component 610 (e.g., a multimedia processing unit), and a wireless connectivity component 612.

An NPU, such as NPU 608, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 608, are configured to accelerate the performance of common machine learning tasks, such as image classification, machine translation, object detection, and various other predictive models. In some examples, a plurality of NPUs may be instantiated on a single chip, such as a SoC, while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In some implementations, the NPU 608 is a part of one or more of the CPU 602, the GPU 604, and/or the DSP 606.

In some examples, the wireless connectivity component 612 may include subcomponents, for example, for third generation (3G) connectivity, fourth generation (4G) connectivity (e.g., 4G Long-Term Evolution (LTE)), fifth generation connectivity (e.g., 5G or New Radio (NR)), Wi-Fi connectivity, Bluetooth connectivity, and/or other wireless data transmission standards. The wireless connectivity component 612 is further coupled to one or more antennas 614.

The processing system 600 may also include one or more sensor processing units 616 associated with any manner of sensor, one or more image signal processors (ISPs) 618 associated with any manner of image sensor, and/or a navigation processor 620, which may include satellite-based positioning system components (e.g., GPS or GLONASS), as well as inertial positioning system components.

The processing system 600 may also include one or more input and/or output devices 622, such as screens, touch-sensitive surfaces (including touch-sensitive displays), physical buttons, speakers, microphones, and the like.

In some examples, one or more of the processors of the processing system 600 may be based on an ARM or RISC-V instruction set.

The processing system 600 also includes the memory 624, which is representative of one or more static and/or dynamic memories, such as a dynamic random access memory, a flash-based static memory, and the like. In this example, the memory 624 includes computer-executable components, which may be executed by one or more of the aforementioned processors of the processing system 600. In some embodiments, memory 624 is representative of physical memory system 150 of FIG. 1 and/or other memory of processing system 110 of FIG. 1.

In particular, in this example, the memory 624 includes a contiguity determining component 624A, a tag generating component 624B, and a tag associating component 624C. The memory 624 further includes a TLB 624E, which may correspond to TLB 140 of FIGS. 1-3, and may be compressed according to techniques described herein. Though depicted as discrete components for conceptual clarity in FIG. 6 the illustrated components (and others not depicted) may be collectively or individually implemented in various aspects. In some aspects, as described above, the TLB 624E may be integrated into a memory management unit (MMU) which in turn may be integrated into other components such as CPU 602 and/or GPU 604.

The processing system 600 may further comprise a contiguity determining circuit 626, a tag generating circuit 627, and a tag associating circuit 628. The depicted circuits, and others not depicted, may be configured to perform various aspects of the techniques described herein.

For example, the contiguity determining component 624A and/or the contiguity determining circuit 626 may be used to determine that a plurality of physical memory addresses, which are associated with a plurality of virtual storage addresses, are contiguous with one another and share one or more common address bits or one or more common attribute bits, wherein each respective physical memory address of the plurality of physical memory addresses corresponds to a separate respective physical memory page (e.g., in physical memory system 150 of FIG. 1), as discussed above with respect to FIGS. 1-5.

The tag generating component 624B and/or the tag generating circuit 627 may be used to generate a tag for an entry in a TLB (e.g., TLB 624E), the tag representing the plurality of virtual memory addresses, as described above with respect to FIGS. 1-5.

The tag associating component 624C and/or the tag associating circuit 628 may be used to associate, the entry in the TLB (e.g., TLB 624E), the tag with data comprising: a single instance of the one or more common address bits or the one or more common attribute bits of the plurality of physical memory addresses (e.g., the MSBs and/or shared attributes associated with the plurality of physical addresses); and other bits of the plurality of physical memory addresses (e.g., the other, non-shared bits of the plurality of physical addresses and/or the private or non-shared attributes associated with the plurality of physical addresses), as described above with respect to FIGS. 1-5.

Though depicted as separate components and circuits for clarity in FIG. 6, the contiguity determining circuit 626, the tag generating circuit 627, and the tag associating circuit 628 may collectively or individually be implemented in other processing devices of the processing system 600, such as within the CPU 602, the GPU 604, the DSP 606, the NPU 608, and the like. For example, the contiguity determining circuit 626, the tag generating circuit 627, and the tag associating circuit 628 may be implemented via one or more instructions in an instruction set of the CPU 602, the GPU 604, the DSP 606, the NPU 608, or the like.

Generally, the processing system 600 and/or components thereof may be configured to perform the methods described herein.

Notably, in other aspects, elements of the processing system 600 may be omitted, such as where the processing system 600 is a server computer or the like. For example, the multimedia component 610, the wireless connectivity component 612, the sensor processing units 616, the ISPs 618, and/or the navigation processor 620 may be omitted in other aspects. Further, aspects of the processing system 600 may be distributed between multiple devices.

EXAMPLE CLAUSES

Implementation examples are described in the following numbered clauses:

Clause 1: A method for translation lookaside buffer (TLB) compression, comprising: determining that a plurality of physical memory addresses, which are associated with a plurality of virtual memory addresses, are contiguous with one another and share one or more common address bits or one or more common attribute bits, wherein each respective physical memory address of the plurality of physical memory addresses corresponds to a separate respective physical memory page; generating a tag for an entry in a TLB, the tag representing the plurality of virtual memory addresses; and associating, in the entry in the TLB, the tag with data comprising: a single instance of the one or more common address bits or the one or more common attribute bits of the plurality of physical memory addresses; and other bits of the plurality of physical memory addresses.

Clause 2: The method of Clause 1, wherein the tag indicates a virtual memory address arranged as a first virtual memory address in the plurality of virtual memory addresses.

Clause 3: The method of Clause 2, wherein a number of virtual memory addresses in the plurality of virtual memory addresses is identical to a number of physical memory addresses in the plurality of physical memory addresses.

Clause 4: The method of any one of Clause 1-3, wherein the data is stored in a first data bank of the entry in the TLB, and wherein the method further comprises: determining that an additional plurality of physical memory addresses, which are associated with an additional plurality of virtual memory addresses, are contiguous with one another and share one or more respective common address bits or one or more respective common attribute bits, wherein the additional plurality of physical memory addresses are contiguous with the plurality of physical memory addresses, and wherein the tag further represents the additional plurality of virtual memory addresses; and storing, in a second data bank of the entry in the TLB, additional data comprising: a respective single instance of the one or more respective common address bits or the one or more respective common attribute bits of the additional plurality of physical memory addresses; and respective other bits of the additional plurality of physical memory addresses.

Clause 5: The method of any one of Clause 1-4, wherein the plurality of virtual memory addresses are contiguous with one another.

Clause 6: The method of any one of Clause 1-5, wherein the one or more common attribute bits indicate at least one of a security attribute, a memory type, or a permission.

Clause 7: The method of any one of Clause 1-6, further comprising using the entry in the TLB to retrieve any one of the plurality of physical memory addresses based on a corresponding virtual memory address of the plurality of virtual memory addresses.

Clause 8: The method of any one of Clause 1-7, further comprising, prior to generating the tag for the entry in the TLB, enabling a physical memory address compression mode based on determining that a condition has been met.

Clause 9: The method of Clause 8, wherein the determining that the condition has been met is based on determining that the plurality of physical memory addresses are contiguous with one another.

Clause 10: The method of any one of Clause 8-9, further comprising, after resetting a device associated with the plurality of virtual memory addresses and the plurality of physical memory addresses, disabling the physical memory address compression mode based on determining that the condition has not been met.

Clause 11: The method of any one of Clause 1-10, wherein the plurality of virtual memory addresses comprise four or more virtual memory addresses, and wherein the plurality of physical memory addresses comprise a respective four or more physical memory addresses.

Clause 12: The method of any one of Clause 1-11, wherein the one or more common address bits comprise a one or more most significant bits of each of the plurality of physical memory addresses.

Clause 13: The method of any one of Clause 1-12, wherein the other bits are not common to the plurality of physical memory addresses.

Clause 14: A processing system comprising: one or more memories comprising processor-executable instructions; and one or more processors configured to execute the processor-executable instructions and cause the processing system to: determine that a plurality of physical memory addresses, which are associated with a plurality of virtual memory addresses, are contiguous with one another and share one or more common address bits or one or more common attribute bits, wherein each respective physical memory address of the plurality of physical memory addresses corresponds to a separate respective physical memory page; generate a tag for an entry in a TLB, the tag representing the plurality of virtual memory addresses; associate, in the entry in the TLB, the tag with data comprising: a single instance of the one or more common address bits or the one or more common attribute bits of the plurality of physical memory addresses; and other bits of the plurality of physical memory addresses.

Clause 15: The processing system of Clause 14, wherein the tag indicates a virtual memory address arranged as a first virtual memory address in the plurality of virtual memory addresses.

Clause 16: The processing system of Clause 15, wherein a number of virtual memory addresses in the plurality of virtual memory addresses is identical to a number of physical memory addresses in the plurality of physical memory addresses.

Clause 17: The processing system of any one of Clause 14-16, wherein the data is stored in a first data bank of the entry in the TLB, and wherein the one or more processors are configured to execute the processor-executable instructions and cause the processing system to: determine that an additional plurality of physical memory addresses, which are associated with an additional plurality of virtual memory addresses, are contiguous with one another and share one or more respective common address bits or one or more respective common attribute bits, wherein the additional plurality of physical memory addresses are contiguous with the plurality of physical memory addresses, and wherein the tag further represents the additional plurality of virtual memory addresses; and store, in a second data bank of the entry in the TLB, additional data comprising: a respective single instance of the one or more respective common address bits or the one or more respective common attribute bits of the additional plurality of physical memory addresses; and respective other bits of the additional plurality of physical memory addresses.

Clause 18: The processing system of any one of Clause 14-17, wherein the plurality of virtual memory addresses are contiguous with one another.

Clause 19: The processing system of any one of Clause 14-18, wherein the one or more common attribute bits indicate at least one of a security attribute, a memory type, or a permission.

Clause 20: An apparatus, comprising: means for determining that a plurality of physical memory addresses, which are associated with a plurality of virtual memory addresses, are contiguous with one another and share one or more common address bits or one or more common attribute bits, wherein each respective physical memory address of the plurality of physical memory addresses corresponds to a separate respective physical memory page; means for generating a tag for an entry in a TLB, the tag representing the plurality of virtual memory addresses; means for associating, in the entry in the TLB, the tag with data comprising: a single instance of the one or more common address bits or the one or more common attribute bits of the plurality of physical memory addresses; and other bits of the plurality of physical memory addresses.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for translation lookaside buffer (TLB) compression, comprising:
    determining that a plurality of physical memory addresses, which are associated with a plurality of virtual memory addresses, are contiguous with one another and share one or more common address bits or one or more common attribute bits, wherein each respective physical memory address of the plurality of physical memory addresses corresponds to a separate respective physical memory page;
    generating a tag for an entry in a TLB, the tag representing the plurality of virtual memory addresses; and
    associating, in the entry in the TLB, the tag with data comprising:
        a single instance of the one or more common address bits or the one or more common attribute bits of the plurality of physical memory addresses; and
        one or more other bits from each physical memory address of the plurality of physical memory addresses, other than the one or more common address bits or the one or more common attribute bits, that are not shared across the plurality of physical memory addresses.

2. The method of claim 1, wherein the tag indicates a virtual memory address arranged as a first virtual memory address in the plurality of virtual memory addresses.

3. The method of claim 2, wherein a number of virtual memory addresses in the plurality of virtual memory addresses is identical to a number of physical memory addresses in the plurality of physical memory addresses.

4. The method of claim 1, wherein the data is stored in a first data bank of the entry in the TLB, and wherein the method further comprises:
    determining that an additional plurality of physical memory addresses, which are associated with an additional plurality of virtual memory addresses, are contiguous with one another and share one or more respective common address bits or one or more respective common attribute bits, wherein the additional plurality of physical memory addresses are contiguous with the plurality of physical memory addresses, and wherein the tag further represents the additional plurality of virtual memory addresses; and
    storing, in a second data bank of the entry in the TLB, additional data comprising:
        a respective single instance of the one or more respective common address bits or the one or more respective common attribute bits of the additional plurality of physical memory addresses; and
        respective other bits of the additional plurality of physical memory addresses.

5. The method of claim 1, wherein the plurality of virtual memory addresses are contiguous with one another.

6. The method of claim 1, wherein the one or more common attribute bits indicate at least one of a security attribute, a memory type, or a permission.

7. The method of claim 1, further comprising using the entry in the TLB to retrieve any one of the plurality of physical memory addresses based on a corresponding virtual memory address of the plurality of virtual memory addresses.

8. The method of claim 1, further comprising, prior to generating the tag for the entry in the TLB, enabling a physical memory address compression mode based on determining that a condition has been met.

9. The method of claim 8, wherein the determining that the condition has been met is based on determining that the plurality of physical memory addresses are contiguous with one another.

10. The method of claim 8, further comprising, after resetting a device associated with the plurality of virtual memory addresses and the plurality of physical memory addresses, disabling the physical memory address compression mode based on determining that the condition has not been met.

11. The method of claim 1, wherein the plurality of virtual memory addresses comprise four or more virtual memory addresses, and wherein the plurality of physical memory addresses comprise a respective four or more physical memory addresses.

12. The method of claim 1, wherein the one or more common address bits comprise a one or more most significant bits of each of the plurality of physical memory addresses.

13. A processing system comprising:
one or more memories comprising processor-executable instructions; and
one or more processors configured to execute the processor-executable instructions and cause the processing system to:
    determine that a plurality of physical memory addresses, which are associated with a plurality of virtual memory addresses, are contiguous with one another and share one or more common address bits or one or more common attribute bits, wherein each respective physical memory address of the plurality of physical memory addresses corresponds to a separate respective physical memory page;
    generate a tag for an entry in a TLB, the tag representing the plurality of virtual memory addresses; and
    associate, in the entry in the TLB, the tag with data comprising:
        a single instance of the one or more common address bits or the one or more common attribute bits of the plurality of physical memory addresses; and
        one or more other bits from each physical memory address of the plurality of physical memory addresses, other than the one or more common address bits or the one or more common attribute bits, that are not shared across the plurality of physical memory addresses.

14. The processing system of claim 13, wherein the tag indicates a virtual memory address arranged as a first virtual memory address in the plurality of virtual memory addresses.

15. The processing system of claim 14, wherein a number of virtual memory addresses in the plurality of virtual memory addresses is identical to a number of physical memory addresses in the plurality of physical memory addresses.

16. The processing system of claim 13, wherein the data is stored in a first data bank of the entry in the TLB, and wherein the one or more processors are configured to execute the processor-executable instructions and cause the processing system to:
    determine that an additional plurality of physical memory addresses, which are associated with an additional plurality of virtual memory addresses, are contiguous with one another and share one or more respective common address bits or one or more respective common attribute bits, wherein the additional plurality of physical memory addresses are contiguous with the plurality of physical memory addresses, and wherein the tag further represents the additional plurality of virtual memory addresses; and
    store, in a second data bank of the entry in the TLB, additional data comprising:
        a respective single instance of the one or more respective common address bits or the one or more respective common attribute bits of the additional plurality of physical memory addresses; and
        respective other bits of the additional plurality of physical memory addresses.

17. The processing system of claim 13, wherein the plurality of virtual memory addresses are contiguous with one another.

18. The processing system of claim 13, wherein the one or more common attribute bits indicate at least one of a security attribute, a memory type, or a permission.

19. An apparatus, comprising:
means for determining that a plurality of physical memory addresses, which are associated with a plurality of virtual memory addresses, are contiguous with one another and share one or more common address bits or one or more common attribute bits, wherein each respective physical memory address of the plurality of physical memory addresses corresponds to a separate respective physical memory page;
means for generating a tag for an entry in a TLB, the tag representing the plurality of virtual memory addresses; and
means for associating, in the entry in the TLB, the tag with data comprising:
    a single instance of the one or more common address bits or the one or more common attribute bits of the plurality of physical memory addresses; and
    one or more other bits from each physical memory address of the plurality of physical memory addresses, other than the one or more common address bits or the one or more common attribute bits, that are not shared across the plurality of physical memory addresses.

* * * * *